United States Patent [19]

Gell

[11] 4,225,867
[45] * Sep. 30, 1980

[54] ORIENTATION SYSTEM

[76] Inventor: Harold A. Gell, 13720 Lockdale Rd., Silver Spring, Md. 20906

[*] Notice: The portion of the term of this patent subsequent to Dec. 6, 1994, has been disclaimed.

[21] Appl. No.: 943,719

[22] Filed: Sep. 19, 1978

[51] Int. Cl.$^3$ ................................................ G01S 3/04
[52] U.S. Cl. ................................ 343/113 R; 340/753; 340/754; 343/112 PT
[58] Field of Search ...................... 343/112 PT, 113 R; 340/754, 753

[56] References Cited

U.S. PATENT DOCUMENTS

| 2,462,077 | 2/1949 | Duggar | 343/112 R |
| 2,909,692 | 10/1959 | Cusano | 250/213 R X |
| 3,406,312 | 10/1968 | Redman | 343/112 PT |
| 3,898,642 | 8/1975 | Dorey et al. | 340/753 |
| 4,060,910 | 12/1977 | Gell, Jr. | 343/112 PT UX |

Primary Examiner—Maynard R. Wilbur
Assistant Examiner—Richard E. Berger
Attorney, Agent, or Firm—Harold A. Gell

[57] ABSTRACT

An orientation system adapted to be mounted within a vehicle, comprising a display including a rotational heading indicating compass card fabricated from an image retaining fluorescent display panel responsive to bearing data signals generated by selected ones of a plurality of light emitting diodes.

16 Claims, 6 Drawing Figures

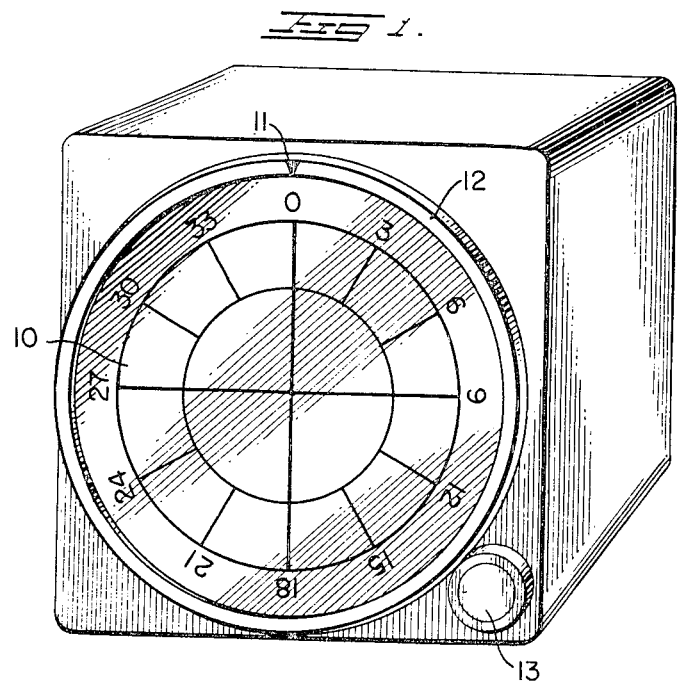
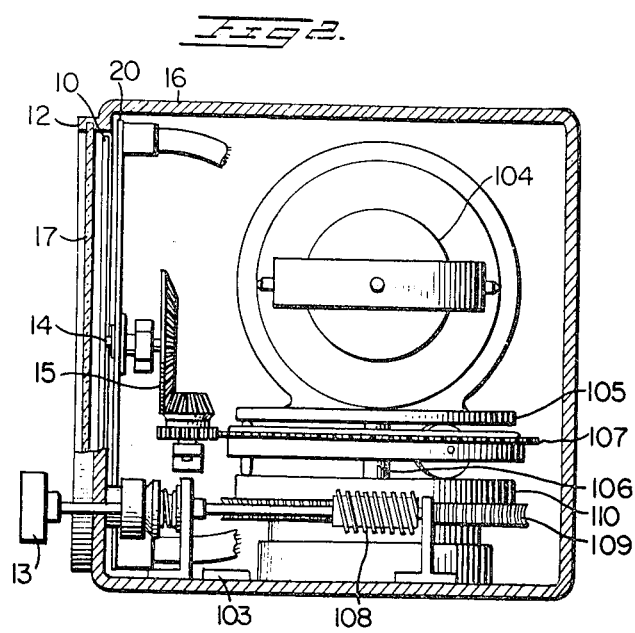

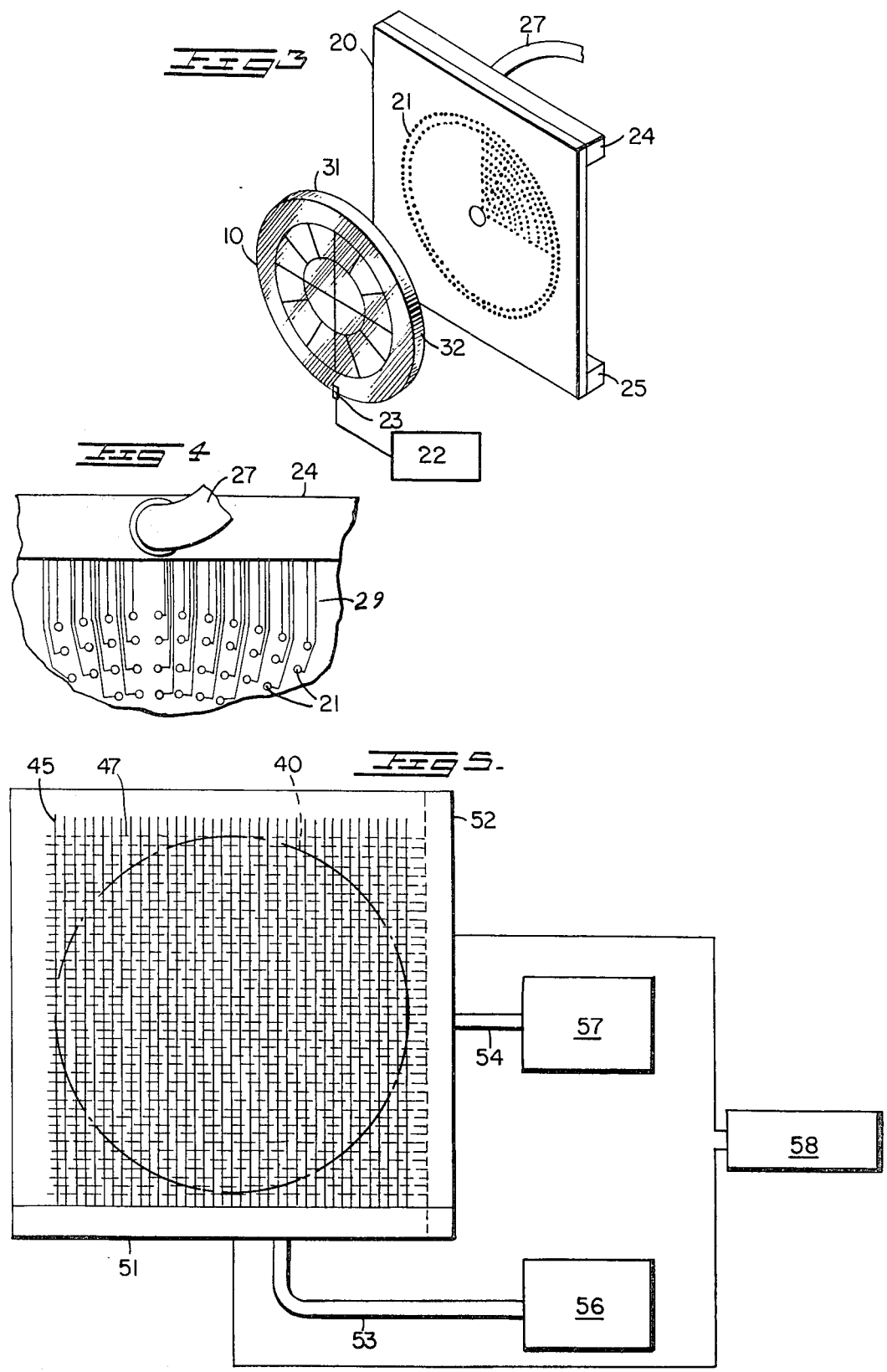

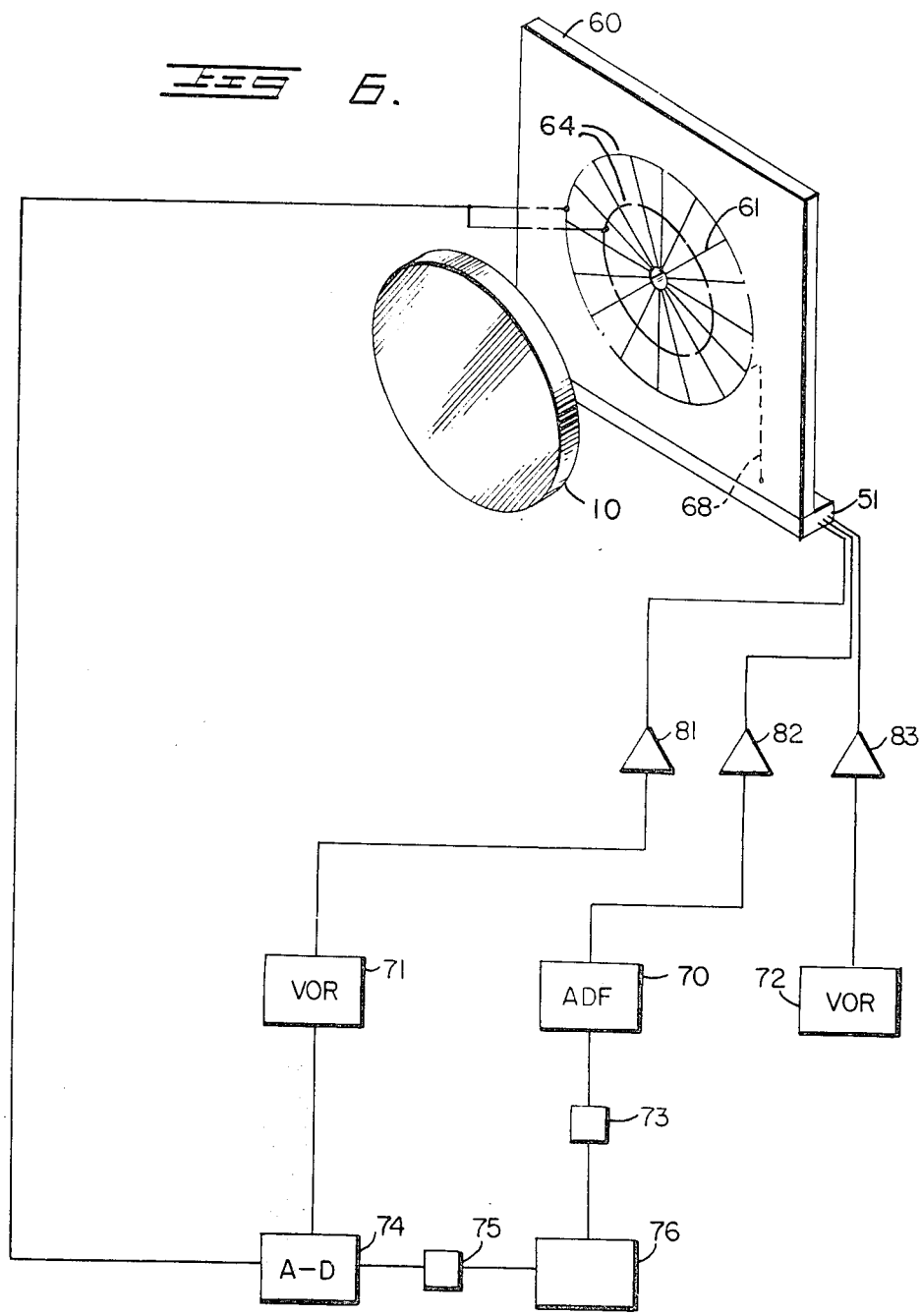

ORIENTATION SYSTEM

THE INVENTION

This invention relates to a means to provide bearing indications from a vehicle to a source of original or reflected radiation. The invention disclosed herein is related to concepts presented in U.S. Pat. No. 4,060,910 on Orientation System issued Dec. 6, 1977.

BACKGROUND OF THE INVENTION

Modern technology has produced a wide variety of electronic devices adapted to indicate the bearing and distance of an object from a vehicle. Examples of relatively broad categories of such devices are radio direction finders, target tracking radars, storm cloud tracking radars and atmospheric disturbance detectors.

Radio direction finders generally incorporate a simple means to indicate bearing only except in the case of target identification transpondors. These latter systems function in cooperation with a rotatable antenna synchronized to a plan position indicator or PPI oscilloscope adapted to function similar to a tracking radar system except a transpondor is located in the target and adapted to provide a reply which is utilized by the system instead of a radar echo.

Radar systems using PPI displays have been used in vehicles such as aircraft for a significant number of years to indicate a large variety of items such as land masses, cities, other aircraft and areas of heavy precipitation. This latter application of radar systems commonly known as weather radar has found wide spread use in aircraft due to its ability to aid a flight crew in avoiding severe turbulence associated with thunderstorms.

A relatively newer approach to detecting severe turbulence associated with thunderstorms has recently been provided by systems combining radio receivers and plan position indicators wherein the radio receivers are responsive to the electromagnetic energy generated by lightning.

All of the foregoing systems utilize plan position indicators based upon cathode ray tubes which incorporate an electronically produced radial deflection in combination with an electromechanically produced rotational deflection an an electron beam. The rotational deflection or sweep of the beam is generally produced by rotating a deflection coil about the neck of a cathode ray tube in synchronization with a rotating or oscillating antenna. More recent technology has produced systems in which the target data is stored in computer means and displayed on the face of the cathode ray tube as a result of stationary electronic deflection means responsive to bearing related address data for the target data in storage.

All of the above plan position indicating devices have a serious drawback when used in a vehicle because the target data is the result of the instantaneous relative bearing at the time the signal is received. This vehicle heading oriented display remains fixed so that when the vehicle turns, the target image which has been retained fails to reflect the change in bearing from the vehicle. This results in enlarged and distorted targets and erroneous targets when high rates of turn are encountered.

In the atmospheric disturbance detection devices utilized to detect the presence of thunderstorms, the display means is usually a computer processed relative bearing indication on a cathode ray tube utilizing electronic deflection only. In these systems the display is a function of an automatic direction finding signal processed by a phase responsive antenna system. The received signals are retained in a storage means for a relatively long period of time when contrasted to normal radar return echos and used to generate a picture of severe weather cells. If the vehicle turns, the bearing data presented will be in error as a function of the amount of heading change of the vehicles since the last display update. This could be as much as 180 degrees in some instances and render the display completely useless.

OBJECTIVES OF THE INVENTION

In view of the obvious inability of the prior art display systems to indicate proper target bearing without complete updating of the display, it is a primary objective of the present invention to provide a plan position indicator which automatically maintains a true target relative bearing presentation even when the vehicle carrying the indicator is turning at a relatively high rate.

A further objective of the present invention is to provide a plan position indicator using a fluorescent compass heading indicating card.

Another objective of the present invention is to provide a plan position indicator incorporating a plurality of light emitting diodes adapted to selectively activate a fluorescent coating on a dipolar electro-optic indicator in the form of a compass heading card.

A still further objective of the present invention is to provide a plan position indicator in the form of a compass card which has a capability of retaining target data in a display mode a relatively long duration of time.

It is a further objective of the present invention to provide an atmospheric disturbance indicator capable of storing and displaying disturbance incidents for a relatively long duration while maintaining proper relative bearing with respect to the individual incidents.

The foregoing and other objectives of the invention will become apparent in the light of the drawings, specification and claims contained herein.

SUMMARY OF THE INVENTION

Presented hereby is a plan position indicator incorporating a fluorescent display means on a rotatable, compass heading indicator card. The image generating fluorescent materials contained on the rotatable card are activated by a grid of light emitting diodes positioned behind the card and fixed with respect to the rotatable card housing or vehicle in which the device is mounted. Target signals activate individual LED's essentially instantaneously as they are received to cause a target spot to appear on the card. As the vehicle turns that target spot will change in azimuth with respect to the vehicle as long as it is retained on the display.

The display materials utilized on the compass card are selected from fluorescent compounds adapted to have a relatively long image retention time.

DESCRIPTION OF THE DRAWINGS

FIG. 1 is a front three-fourths view of a preferred embodiment of the present invention.

FIG. 2 is a side cutaway view illustrating a preferred embodiment of the present invention.

FIG. 3 is an exploded view of an indicator compass card and light emitting diode assembly.

FIG. 4 is a sectional view of the electrical connection between individual electrode pins and the cable connector.

FIG. 5 is a plan view of an alternate electrode assembly and functional control potential sources.

FIG. 6 is a schematic representation of a preferred embodiment of the invention in combination with an exploded, front three-fourths view of the principle elements comprising the invention.

DESCRIPTION OF THE INVENTION

FIG. 1 depicts a typical indicator incorporating the novel concepts of the present invention. The display 10 is a combined target indicator and compass card which incorporates indicia representing the cardinal compass points. Target indication is achieved by the card through its ability to fluoresce in response to a light emitting diode stimulous. In the preferred embodiment, the card rotates to present the relative magnetic bearing under the indicating arrow 11 at the top of the fron panel bezel 12 and due to this rotation, relative target azimuth is maintained. The card may be rotated by any means but preferably it is driven by a magnetic compass, gyrosyn compass or a gyro compass. For instance, the card 10 can be driven by the selysn receiver motor of a gyroscopically stabilized flux gate compass or remote indicating compass in which a magnetic compass rotates a selysn transmitter. A preferred embodiment, which will be discussed in the specification by way of explanation, utilizes a gyro compass mechanism to drive the indicator compass card 10. In this embodiment, knob 13 is provided to set the gyro compass heading indicator card 10 to the proper magnetic heading.

In the embodiment illustrated in FIG. 2 the indicator compass card 10 is rigidly affixed to shaft 14 which couples the card to the gyroscopic rotating mechanism via gear train 15. The illustrated gyroscopic mechanism is presented as exemplary only and may be any one of the numerous types available. The gyroscope 104 of the gyrocompass device of FIG. 2 is supported by a base 105 which is essentially parallel to a plane tangent to the surface of the earth. The base 105 is supported on a shaft 106 which permits the gyroscope to rotate freely with respect to the case 16 and 360° about an axis perpendicular to the plane tangent to the earths surface. When the gyroscope 104 is spun up it will remain fixed with respect to the perpendicular axis so that relative rotation between the case 16 and base 105 will occur when the case is rotated, as it would be if fixed in the instrument panel of a turning aircraft. A gear 107 is attached to the base 105. It is adapted to drive gear train 15 which rotates the indicator 10. The worm gear 108 cooperates with gear 109 on the support base 110 which supports shaft 106 so that when knob 13 is turned, it will alter the relationship between the gyroscope heading and indicator position.

Positioned immediately behind the rotatable card 10 is a light emitting diode or solid state laser assembly 20 which is rigidly affixed to the indicator case 16. A transparent glass or plastic lens 17 is positioned in the bezel 12 and over the indicator compass card 10 to protect the card and keeps foreign matter out of the assembly.

One form of LED assembly 20 and indicator compass card 10 is illustrated in an exploded view in FIG. 3. This LED assembly is comprised of a plurality of LED's 21 in a circular arrangement adapted to permit a relatively uniform display presentation by generating discrete radiating beams between selected LED's 21 and the indicating material of indicator compass card 10. The spacing between LED's 21 is relatively constant but may be slightly greater around the outer periphery of the electrode assembly as required to permit electrical connection of the pins to target data input cable connectors 24 and 25.

The LED's 21 illustrated in FIG. 4 may be tied directly to individual conductors 29 that are then combined to form cables 27 coupling the assembly to a target signal processing means. The LED's may be placed in a relatively thick material or they may be supported between two thin sheets of dielectric material. In a preferred embodiment a single thick sheet 28 of dielectric material is utilized having a thickness equal to the length of the LED's which are headed at the display side to create a larger image.

An alternate form of the invention utilizes printed wiring 29 to connect the individual LED's 21 to the cable receptacles 24 and 25 at the sides of the electrode assembly 20, see FIGS. 3 and 4.

A preferred form of the invention utilizes a large scale integrated circuit as the LED assembly 20. A large variety of devices are available in the art for providing the light emitting assembly 20. Examples of acceptable construction for assembly 20 are presented in U.S. Pat. No. 3,946,417 on "Minimizing Cross-Talk in L.E.D. Arrays" issued Mar. 23, 1976; U.S. Pat. No. 3,501,676 on "Solid State Matrix Having An Injection Luminescent Diode As The Light Source" issued Mar. 17, 1970; U.S. Pat. No. 3,246,162 on "Electro Luminescent Device Having A Field-Effect Transistor Addressing System" issued Apr. 12, 1976; and U.S. Pat. No. 2,874,308 on "Electro Luminescent Device" issued Feb. 17, 1959. Solid state lasers may also be utilized to provide the light source of assembly 20. An example of such a device acceptable to the construction of the present invention is presented in U.S. Pat. No. 3,996,492 on "Two-Dimensional Integrated Injection Laser Array" issued Dec. 7, 1976.

The indicator compass card 10 of FIG. 3 is comprised of a transparent support member 32 which is coated with a fluorescent material 31. In a preferred embodiment, illumination of the indicator compass card may be enhanced by utilizing an electro luminescent structure responsive to light radiation from assembly 20 as an alternate to the fluorescent material coating 31. An example of an acceptable enhanced illumination system is presented in U.S. Pat. No. 2,909,692 on "Field Enhanced Luminescent System".

If an electro luminescent enhanced system is utilized in indicator 10, brush terminals 23 of FIG. 3 are provided to couple electrical energy required to drive the display from a controllable source 22 to the indicator compass card 10. The controllable source electrical energy 22 for the enhanced electro luminescent display may consist of a variable power supply responsive to ambient light to ensure that satisfactory illumination is provided by the display to allow an operator to view targets at a comfortable light level in all ambient light conditions. Such a device may be implemented by utilizing a light responsive resistor to control the amount of current available to the electro luminescent display of indicator compass card 10. Alternately, current supplied to the indicator compass card 10 may be controlled through the use of a variable potentiometer manually activated by an operator.

In operation, the LED's or lasers of assembly 20 energize the fluorescent coating or enhanced illumination system 31 of the indicator compass card to create a visible image.

An alternate embodiment of the invention is illustrated in FIG. 5 where the indicator compass card includes fluorescent material and the LED assembly 44 is activated by a grid of conductors 45 and 47. The interconnections of conductors 45 and 47 control individual LED's. The electrodes are connected via cable connectors 51 and 52 and cables 53 and 54 to signal processing means 56 and 57 which are adapted to address individual vertical and horizontal electrodes to create an image at predetermined points on the rotating imaging assembly. This embodiment has certain advantages over the previously discussed embodiment for it requires fewer electrical connections to the display generating means and simplifies the addressing electronics.

The signal processing means 56 and 57 of FIG. 5 or of any embodiment, couple electrical impulses from a signal generating source to the display creating LED's. The signal generating source may be a radar receiver of the type adapted to provide target data display signals having display coordinates, or it may be a television video signal generator with the sweep scan synchronized to the horizontal conductor pattern of electrode assembly 47 and digitizing signals synchronized with segments of the horizontal sweep impressed on the vertical conductor pattern of electrode 46, or it may be a radio direction finder and signal processing unit such as the Ryan Stormscope WX-7 manufactured by ((Ryan)))) Stormscope, 4800 Evanswood Drive, Columbus, Ohio, 43229 which is capable of receiving electromagnetic radiation disturbances generated by lightning and processing the received signals using radio direction finding techniques so that the disturbance targets will have an azimuth and distance quality.

In a preferred form of the instant invention illustrated in FIG. 6, one set of LED activating electrodes forms a plurality of radiating conductors 61 which are electrically connected by leads 68 to cable connector 51. The number of radiating conductors is a function of the dimensions of the LED's but preferably the number of conductors is a multiple of 36. A second set of electrodes forms a plurality of closely spaced circular conductors 64 which interact the ray like conductors 61 at LED locations. Conductors 61 and 64 form the energizing means for the LED's.

The individual ray like conductors 61 on LED assembly 60 are connected via conductive connectors 68 and cable connector 51 to an automatic direction finder receiver 70. The analog data normally used to drive a direction indicating meter is digitized, by any one of the acceptable standard methods well known in the art, to provide a number of inputs adapted to match the number of ray conductors 61 on LED assembly 60.

Signals detected by visual omnirange (VOR) receivers 71 and 72 are digitized by one of the standard conversion techniques such as that utilized in the DVOR/100 digital VOR radial display manufactured by HTI, Redwood Avenue, Los Angeles, Calif., 90066 or the Bendix PX2000 Navigation System manufactured by the Bendix Corporation. Avionics Division, P.O. Box 9414, Ft. Lauderdale, Flor., 33310 to provide a number of azimuth outputs corresponding to the number of ray electrode conductors 61 of LED assembly 60.

The signals detected by the ADF are also applied to a discriminator 76 which includes a band pass filter adapted to pass signals of a predetermined frequency range corresponding to the electromagnetic radiation generated by lightning. The output of the discriminator 76 is applied to an analog-to-digital converter 74 which converts the signals received from the discriminator to a plurality of digital outputs corresponding to the number of electrode conductor rings 64. This interconnection is arranged so that the strongest signal will energize the smallest ring electrode at the center of the LED assembly 60 and the weakest signal will energize the largest circular electrode 64 to provide a range indication. A variable attenuation pad 75 is positioned between discriminator 76 and analog-to-digital converter 74 so that the amplitude of the signal applied to the analog-to-digital converter may be adjusted to cause the concentric ring electrodes 64 to represent signals at predetermined ranges. An amplification network 73 is positioned between the ADF receiver and the analog-to-digital converter so that the effective range of the device may be set to predetermined ranges such a 0 to 10 miles, 0 to 20 miles, 0 to 100 miles, 0 to 200 miles, etc.

Signal strength controlling means such as amplifiers or attenuation means 81, 82 and 83 are provided between the VOR receivers 71 and 72 and ADF receiver 70 and the LED assembly 60 so that an operator may cause signals from a specific receiver to be of a greater amplitude and thus create a brighter display or conversely have a lesser amplitude and create a dimmer display.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A relative azimuth indication system, comprising:
an indicator activating means including a plurality of radiation emitting devices of a type not requiring an evacuated atmosphere;
an indicator including an image area which fluoresces when radiated by said radiation emitting devices;
means to selectively energize individual ones of said radiation emitting devices; and
means to rotate said indicator relative to said indicator activating means.

2. A relative azimuth indication system as defined in claim 1, wherein said means to rotate said indicator comprises:
a means responsive to the earths magnetic field and adapted to rotate said indicator in accordance with relative magnetic heading.

3. A relative azimuth indication system as defined in claim 1 wherein said means to rotate said indicator comprises:
a selsyn receiver including a drive shaft adapted to support said indicator;
a selsyn transmitter electrically coupled to said selsyn receiver; and
a means responsive to the earths magnetic field and adapted to rotate said selsyn transmitter in response thereto.

4. A relative azimuth indication system as defined in claim 3, wherein said means responsive to the earths magnetic field is a gyroscopically stabilized flux gate magnetic sensor.

5. A relative azimuth indication system as defined in claim 3, wherein said means responsive to the earths magnetic field is a gyrosyn compass.

6. A relative azimuth indication system as defined in claim 1, wherein said means to rotate said indicator comprises a gyro compass.

7. A relative azimuth indication system as defined in claim 1, wherein said means to rotate said indicator comprises:
   a gyroscope;
   a means to support said gyroscope in a plane essentially parallel to a plane tangent to the surface of the earth and permit 360° of rotation about an axis perpendicular to said plane; and
   coupling means adapted to rotate said indicator as a function of the relative rotation between said gyroscope and said support means about said penpendicular axis.

8. A relative azimuth indication system as defined in claim 1, wherein said indicator comprises:
   a light transmissive plate.

9. A relative azimuth indication system as defined in claim 1, wherein said radiation emitting devices are lasers.

10. A relative azimuth indication system as defined in claim 1, wherein said radiation emitting devices are light emitting diodes.

11. A relative azimuth indication system as defined in claim 1, wherein said means to selectively energize individual ones of said radiation emitting devices comprises:
   a first set of conductors for providing electrical current to said radiation emitting devices; and a second set of conductors for providing an electrical current return means from said radiation emitting devices.

12. A relative azimuth indication system as defined in claim 11, wherein said first set of conductors comprises a plurality of parallel conductors electrically isolated from each other; and
   said second set of conductors comprises a plurality of parallel conductors electrically isolated from each other and from said first set of conductors, said second set of conductors orientated perpendicular to said first set of conductors.

13. A relative azimuth indication system as defined in claim 11, wherein one set of conductors comprises a plurality of concentric conductors forming circles of increasing diameter starting from a point essentially at the center of said image area and electrically isolated from each other and the other set of conductors comprises a plurality of electrically isolated conductors equally spaced from each other and radiating outward from the center of said image area of said indicator.

14. A relative azimuth indicator system as defined in claim 1, wherein said means to selectively energize individual ones of said radition emitting devices further comprises:
   a directional radio receiver;
   a band pass filter means responsive to signals detected by said radio receiver and adapted to pass signals representing lightning generated static signals;
   a first analog-to-digital converter adapted to convert said signals passed by said band pass filter into range pulses representing the distance between the origin of said lightning generated static signals and said radio receiver;
   a second analog-to-digital converter adapted to convert the analog azimuth data representing signals received by said directional radio receiver into azimuth pulses representing the relative bearing of the source of said signals; and
   means to selectively couple said range and azimuth pulses to different ones of said radiation emitting devices.

15. A relative azimuth indicator system as defined in claim 14, further comprising:
   means to convert the analog azimuth signal output of a visual omni range navigational receiver converter to azimuth pulses representing magnetic bearing to the source signals; and
   means to selectively couple said pulses to different ones of said radiation emitting devices.

16. A relative azimuth indicator system as defined in claim 13, wherein means to selectively energize individual ones of said radiation emitting devices further comprises:
   a directional radio receiver;
   a band pass filter means responsive to signals detected by said radio receiver and adapted to pass signals representing lightning generated static signals;
   a first analog-to-digital converter adapted to convert said signals passed by said band pass filter into range pulses representing the distance between the origin of said lightning generated static signals and said radio receiver;
   a second analog-to-digital converter adapted to convert the analog azimuth data representing signals received by said directional radio receiver into azimuth pulses representing the relative bearing of the source of said signals;
   means to couple said range pulses to said individual concentric conductors; and
   means to couple said azimuth pulses to said individual radiating conductors.

* * * * *